United States Patent
Cariou et al.

(10) Patent No.: US 12,120,735 B2
(45) Date of Patent: Oct. 15, 2024

(54) APPARATUS, SYSTEM AND METHOD OF COMMUNICATING A MULTI-LINK ELEMENT FROM A MULTI-LINK DEVICE

(71) Applicant: INTEL CORPORATION, Santa Clara, CA (US)

(72) Inventors: Laurent Cariou, Portland, OR (US); Po-Kai Huang, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 549 days.

(21) Appl. No.: 17/133,940

(22) Filed: Dec. 24, 2020

(65) Prior Publication Data

US 2021/0120586 A1   Apr. 22, 2021

Related U.S. Application Data

(60) Provisional application No. 62/991,203, filed on Mar. 18, 2020.

(51) Int. Cl.
*H04W 74/0816* (2024.01)
*H04B 7/0413* (2017.01)
(Continued)

(52) U.S. Cl.
CPC ...... *H04W 74/0816* (2013.01); *H04B 7/0413* (2013.01); *H04B 7/0617* (2013.01);
(Continued)

(58) Field of Classification Search
CPC ............. H04W 74/0816; H04W 76/15; H04W 74/004; H04W 84/12; H04B 7/0413; H04B 7/0617; H04L 69/14
See application file for complete search history.

(56) References Cited

U.S. PATENT DOCUMENTS

2017/0265122 A1\* 9/2017 Levy ..................... H04W 48/16
2019/0215884 A1\* 7/2019 Patil .................. H04W 52/0219
(Continued)

OTHER PUBLICATIONS

IEEE Std 802.11™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.
(Continued)

*Primary Examiner* — Ian N Moore
*Assistant Examiner* — Latresa A McCallum
(74) *Attorney, Agent, or Firm* — Shichrur & Co.

(57) ABSTRACT

For example, a reporting wireless communication station (STA) of a Multi-Link Device (MLD) including a plurality of STAs may be configured to generate a multi-link element including one or more STA profile subelements for one or more reported STAs of the MLD, respectively, wherein a STA profile subelement corresponding to a reported STA includes one or more elements of information corresponding to the reported STA; to set a field in the STA profile subelement corresponding to the reported STA to indicate whether or not the STA profile subelement corresponding to the reported STA is to be interpreted to provide all information corresponding to the reported STA; and to transmit a frame including the multi-link element.

23 Claims, 6 Drawing Sheets

(51) Int. Cl.
*H04B 7/06* (2006.01)
*H04W 74/00* (2009.01)
*H04W 76/15* (2018.01)
*H04W 84/12* (2009.01)

(52) U.S. Cl.
CPC ......... *H04W 74/004* (2013.01); *H04W 76/15* (2018.02); *H04W 84/12* (2013.01)

(56) References Cited

U.S. PATENT DOCUMENTS

| | | |
|---|---|---|
| 2019/0268956 A1 | 8/2019 | Xiao et al. |
| 2019/0335454 A1* | 10/2019 | Huang ................ H04W 72/542 |
| 2020/0015181 A1 | 1/2020 | Patil et al. |
| 2021/0037583 A1 | 2/2021 | Seok et al. |
| 2021/0120599 A1 | 4/2021 | Cariou et al. |
| 2021/0144787 A1 | 5/2021 | Kwon et al. |
| 2021/0289568 A1 | 9/2021 | Cariou et al. |
| 2022/0132419 A1* | 4/2022 | Kwon ............... H04W 52/0216 |

OTHER PUBLICATIONS

Office Action for U.S. Appl. No. 17/133,971, mailed on May 11, 2023, 49 pages.
Office Action for U.S. Appl. No. 17/213,217, mailed on May 11, 2023, 68 pages.
Office Action for U.S. Appl. No. 17/213,217, mailed on Oct. 10, 2023, 67 pages.
Notice of Allowance for U.S. Appl. No. 17/213,217, mailed on Jan. 5, 2024, 13 pages.

* cited by examiner

APPARATUS, SYSTEM AND METHOD OF COMMUNICATING A MULTI-LINK ELEMENT FROM A MULTI-LINK DEVICE

CROSS REFERENCE

This application claims the benefit of and priority from U.S. Provisional Patent Application No. 62/991,203 entitled "Multi-Link Element for Multi-Link Device", filed Mar. 18, 2020, the entire disclosure of which is incorporated herein by reference.

TECHNICAL FIELD

Aspects described herein generally relate to communicating a multi-link element.

BACKGROUND

A wireless communication network may include multiple wireless communication stations, which may be configured to communicate according to one or more wireless communication protocols. For example, according to some protocols, a network may include one or more Access Point (AP) STAs to communicate with one or more non-AP STAs.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
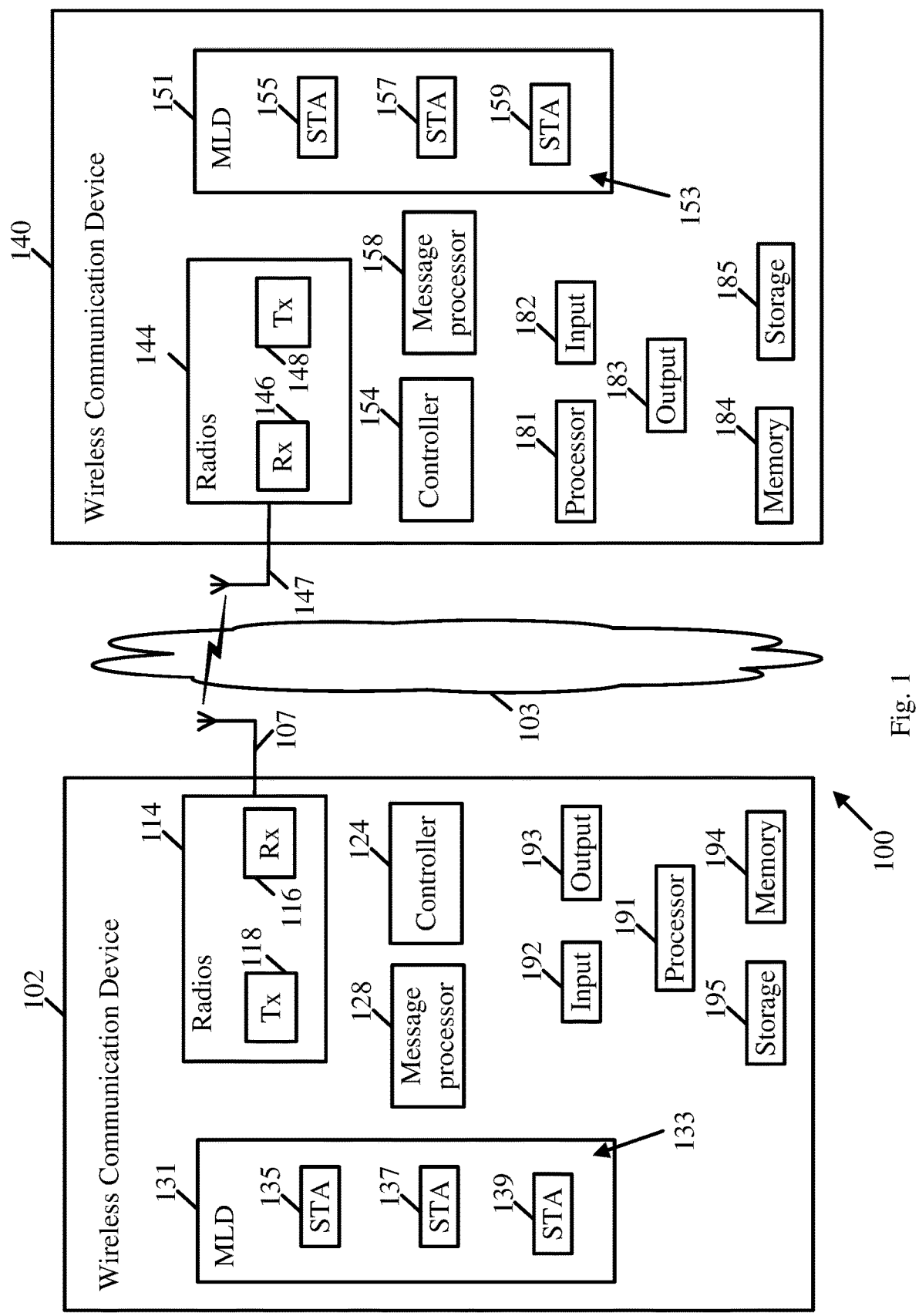
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements; Part 11: Wireless LAN Medium Access Control (MAC) and Physical Layer (PHY) Specifications, Dec. 7, 2016); and/or IEEE 802.11be (IEEE P802.11be/D0.2 Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT), November 2020)) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a 2.4 Gigahertz (GHz) frequency band, a 5 GHz frequency band, and/or a 6 GHz frequency band. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHz, a frequency band above 45 GHz, a 5G frequency band, a frequency band below 20 GHz, e.g., a Sub 1 GHz (S1G) band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, and/or one more other devices.

In some demonstrative aspects, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102 and/or 140 may be capable of communicating content, data, information and/or signals via a wireless medium (WM) 103. In some demonstrative aspects, wireless medium 103 may include, for example, a radio channel, an RF channel, a WiFi channel, a cellular channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a 2.4 GHz wireless communication frequency band, one or more channels in a 5 GHz wireless communication frequency band, and/or one or more channels in a 6 GHz wireless communication frequency band.

In other aspects, WM 103 may include any other type of channel over any other frequency band.

In some demonstrative aspects, device 102 and/or device 140 may include one or more radios including circuitry and/or logic to perform wireless communication between devices 102, 140 and/or one or more other wireless communication devices. For example, device 102 may include one or more radios 114, and/or device 140 may include one or more radios 144.

In some demonstrative aspects, radios 114 and/or 144 may include one or more wireless receivers (Rx) including circuitry and/or logic to receive wireless communication signals, RF signals, frames, blocks, transmission streams, packets, messages, data items, and/or data. For example, a radio 114 may include at least one receiver 116, and/or a radio 144 may include at least one receiver 146.

In some demonstrative aspects, radios 114 and/or 144 may include one or more wireless transmitters (Tx) including circuitry and/or logic to transmit wireless communication signals, RF signals, frames, blocks, transmission streams, packets, messages, data items, and/or data. For example, a radio 114 may include at least one transmitter 118, and/or a radio 144 may include at least one transmitter 148.

In some demonstrative aspects, radios 114 and/or 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative aspects, radios 114 and/or 144 may be configured to communicate over a 2.4 GHz band, a 5 GHz band, a 6 GHz band, and/or any other band, for example, a directional band, e.g., an mmWave band, a 5G band, an S1G band, and/or any other band.

In some demonstrative aspects, radios 114 and/or 144 may include, or may be associated with one or more, e.g., a plurality of, antennas.

In some demonstrative aspects, device 102 may include one or more, e.g., a plurality of, antennas 107, and/or device 140 may include on or more, e.g., a plurality of, antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of one or more radios 114, and/or at least part of the functionality of message processor 158 may be implemented as part of one or more radios 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of one or more radios 114. For example, the chip or SoC may include one or more elements of controller 124, one or more elements of message processor 128, and/or one or more elements of one or more radios 114. In one example, controller 124, message processor 128, and one or more radios 114 may be implemented as part of the chip or SoC.

In other aspects, controller 124, message processor 128 and/or the one or more radios 114 may be implemented by one or more additional or alternative elements of device 102.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of one or more radios 144. For example, the chip or SoC may include one or more elements of controller 154, one or more elements of message processor 158, and/or one or more elements of one or more radios 144. In one example, controller 154, message processor 158, and one or more radios 144 may be implemented as part of the chip or SoC.

In other aspects, controller 154, message processor 158 and/or the one or more radios 144 may be implemented by one or more additional or alternative elements of device 140.

In some demonstrative aspects, device 102 and/or device 140 may include, operate as, perform the role of, and/or perform one or more functionalities of, one or more STAs. For example, device 102 may include at least one STA, and/or device 140 may include at least one STA.

In some demonstrative aspects, device 102 and/or device 140 may include, operate as, perform the role of, and/or perform one or more functionalities of, one or more Extremely High Throughput (EHT) STAs. For example, device 102 may include, operate as, perform the role of, and/or perform one or more functionalities of, one or more EHT STAs, and/or device 140 may include, operate as, perform the role of, and/or perform one or more functionalities of, one or more EHT STAs.

In other aspects, devices 102 and/or 140 may include, operate as, perform the role of, and/or perform one or more functionalities of, any other wireless device and/or station, e.g., a WLAN STA, a WiFi STA, and the like.

In some demonstrative aspects, device 102 and/or device 140 may be configured operate as, perform the role of, and/or perform one or more functionalities of, an access point (AP), e.g., an EHT AP STA.

In some demonstrative aspects, device 102 and/or device 140 may be configured to operate as, perform the role of, and/or perform one or more functionalities of, a non-AP STA, e.g., an EHT non-AP STA.

In other aspects, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains one station (STA) and provides access to the distribution services, via the wireless medium (WM) for associated STAs. An AP may include a STA and a distribution system access function (DSAF). The AP may perform any other additional or alternative functionality.

In some demonstrative aspects devices 102 and/or 140 may be configured to communicate in an EHT network, and/or any other network.

In some demonstrative aspects, devices 102 and/or 140 may be configured to operate in accordance with one or more specifications, for example, including one or more IEEE 802.11 Specifications, e.g., an IEEE 802.11-2016 Specification, an IEEE 802.11be Specification, and/or any other specification and/or protocol.

In some demonstrative aspects, device 102 and/or device 140 may include, operate as, perform a role of, and/or perform the functionality of, one or more multi-link logical entities, e.g., as described below.

For example, a multi-link logical entity may include a logical entity that contains one or more STAs. The logical entity may have one MAC data service interface and primitives to the logical link control (LLC) and a single address associated with the interface, which can be used to communicate on a distribution system medium (DSM). For example, the DSM may include a medium or set of media used by a distribution system (DS) for communications between APs, mesh gates, and the portal of an extended service set (ESS). For example, the DS may include a system used to interconnect a set of basic service sets (BSSs) and integrated local area networks (LANs) to create an extended service set (ESS). In one example, a multi-link logical entity may allow STAs within the multi-link logical entity to have the same MAC address. The multi-link entity may perform any other additional or alternative functionality.

In some demonstrative aspects, device 102 and/or device 140 may include, operate as, perform a role of, and/or perform the functionality of, a Multi-Link (ML) Device (MLD). For example, device 102 may include, operate as, perform a role of, and/or perform the functionality of, at least one MLD, and/or device 140 may include, operate as, perform a role of, and/or perform the functionality of, at least one MLD, e.g., as described below.

For example, an MLD may include a device that is a logical entity and has more than one affiliated STA and has a single MAC service access point (SAP) to LLC, which includes one MAC data service. The MLD may perform any other additional or alternative functionality.

In some demonstrative aspects, for example, an infrastructure framework may include a multi-link AP logical entity, which includes APs, e.g., on one side, and a multi-link non-AP logical entity, which includes non-APs, e.g., on the other side.

In some demonstrative aspects, device 102 and/or device 140 may be configured operate as, perform the role of, and/or perform one or more functionalities of, an AP MLD.

In some demonstrative aspects, device 102 and/or device 140 may be configured to operate as, perform the role of, and/or perform one or more functionalities of, a non-AP MLD.

In other aspects, device 102 and/or device 140 may operate as, perform the role of, and/or perform one or more functionalities of, any other additional or alternative device and/or station.

For example, an AP MLD may include an MLD, where each STA affiliated with the MLD is an AP. In one example, the AP MLD may include a multi-link logical entity, where each STA within the multi-link logical entity is an EHT AP. The AP MLD may perform any other additional or alternative functionality.

For example, a non-AP MLD may include an MLD, where each STA affiliated with the MLD is a non-AP STA. In one example, the non-AP MLD may include a multi-link logical entity, where each STA within the multi-link logical entity is a non-AP EHT STA. The non-AP MLD may perform any other additional or alternative functionality.

In one example, a multi-link infrastructure framework may be configured as an extension from a one link operation between two STAs, e.g., an AP and a non-AP STA.

In some demonstrative aspects, controller 124 may be configured to control, perform and/or to trigger, cause, instruct and/or control device 102 to operate as, perform a role of, and/or perform one or more operations and/or functionalities of, an MLD 131 including a plurality of STAs 133, e.g., including a STA 135, a STA 137 and/or a STA 139. In some aspects, as shown in FIG. 1, MLD 131 may include three STAs. In other aspects, MLD 131 may include any other number of STAs.

In one example, STA 135, STA 137 and/or STA 139 may operate as, perform a role of, and/or perform one or more operations and/or functionalities of, an EHT STA. In other aspects, STA 135, STA 137 and/or STA 139 may perform any other additional or alternative functionality.

In some demonstrative aspects, controller 124 may be configured to control, perform and/or to trigger, cause, instruct and/or control device 102 to operate as, perform a role of, and/or perform one or more operations and/or functionalities of, an AP MLD 131 including a plurality of AP STAs 133, e.g., including an AP STA 135, an AP STA 137 and/or an AP STA 139. In some aspects, as shown in FIG. 1, AP MLD 131 may include three AP STAs. In other aspects, AP MLD 131 may include any other number of AP STAs.

In one example, AP STA 135, AP STA 137 and/or AP STA 139 may operate as, perform a role of, and/or perform one or more operations and/or functionalities of, an EHT AP STA. In other aspects, AP STA 135, AP STA 137 and/or AP STA 139 may perform any other additional or alternative functionality.

In some demonstrative aspects, controller 124 may be configured to control, perform and/or to trigger, cause, instruct and/or control device 102 to operate as, perform a role of, and/or perform one or more operations and/or functionalities of, a non-AP MLD 131 including a plurality of non-AP STAs 133, e.g., including a non-AP STA 135, a non-AP STA 137 and/or a non-AP STA 139. In some aspects, as shown in FIG. 1, non-AP MLD 131 may include three non-AP STAs. In other aspects, non-AP MLD 131 may include any other number of non-AP STAs.

In one example, non-AP STA 135, non-AP STA 137 and/or non-AP STA 139 may operate as, perform a role of, and/or perform one or more operations and/or functionalities of, an EHT non-AP STA. In other aspects, non-AP STA 135, non-AP STA 137, and/or non-AP STA 139 may perform any other additional or alternative functionality.

In some demonstrative aspects, for example, the one or more radios 114 may include, for example, a radio for communication by STA 135 over a first wireless communication frequency channel and/or frequency band, e.g., a 2.4 Ghz band, as described below.

In some demonstrative aspects, for example, the one or more radios 114 may include, for example, a radio for communication by STA 137 over a second wireless communication frequency channel and/or frequency band, e.g., a 5 Ghz band, as described below.

In some demonstrative aspects, for example, the one or more radios 114 may include, for example, a radio for communication by STA 139 over a third wireless communication frequency channel and/or frequency band, e.g., a 6 Ghz band, as described below.

In some demonstrative aspects, the radios 114 utilized by STAs 133 may be implemented as separate radios. In other aspects, the radios 114 utilized by STAs 133 may be implemented by one or more shared and/or common radios and/or radio components.

In some demonstrative aspects, controller 154 may be configured to control, perform and/or to trigger, cause, instruct and/or control device 140 to operate as, perform a role of, and/or perform one or more operations and/or functionalities of, an MLD 151 including a plurality of STAs 153, e.g., including a STA 155, a STA 157 and/or a STA 159. In some aspects, as shown in FIG. 1, MLD 151 may include three STAs. In other aspects, MLD 151 may include any other number of STAs.

In one example, STA 155, STA 157 and/or STA 159 may operate as, perform a role of, and/or perform one or more operations and/or functionalities of, an EHT STA. In other aspects, STA 155, STA 157 and/or STA 159 may perform any other additional or alternative functionality.

In some demonstrative aspects, for example, the one or more radios 144 may include, for example, a radio for communication by STA 145 over a first wireless communication frequency channel and/or frequency band, e.g., a 2.4 Ghz band, as described below.

In some demonstrative aspects, for example, the one or more radios 144 may include, for example, a radio for communication by STA 157 over a second wireless communication frequency channel and/or frequency band, e.g., a 5 Ghz band, as described below.

In some demonstrative aspects, for example, the one or more radios 144 may include, for example, a radio for communication by STA 159 over a third wireless communication frequency channel and/or frequency band, e.g., a 6 Ghz band, as described below.

In some demonstrative aspects, the radios 144 utilized by STAs 153 may be implemented as separate radios. In other aspects, the radios 144 utilized by STAs 153 may be implemented by one or more shared and/or common radios and/or radio components.

In some demonstrative aspects, controller 154 may be configured to control, perform and/or to trigger, cause, instruct and/or control MLD 151 to operate as, perform a role of, and/or perform one or more operations and/or functionalities of, a non-AP MLD. For example, STA 155, STA 157 and/or STA 159 may operate as, perform a role of, and/or perform one or more operations and/or functionalities of, a non-AP EHT STA.

In some demonstrative aspects, controller 154 may be configured to control, perform and/or to trigger, cause, instruct and/or control MLD 151 to operate as, perform a role of, and/or perform one or more operations and/or functionalities of, an AP MLD. For example, STA 155, STA 157 and/or STA 159 may operate as, perform a role of, and/or perform one or more operations and/or functionalities of, an AP EHT STA.

Figure 2:
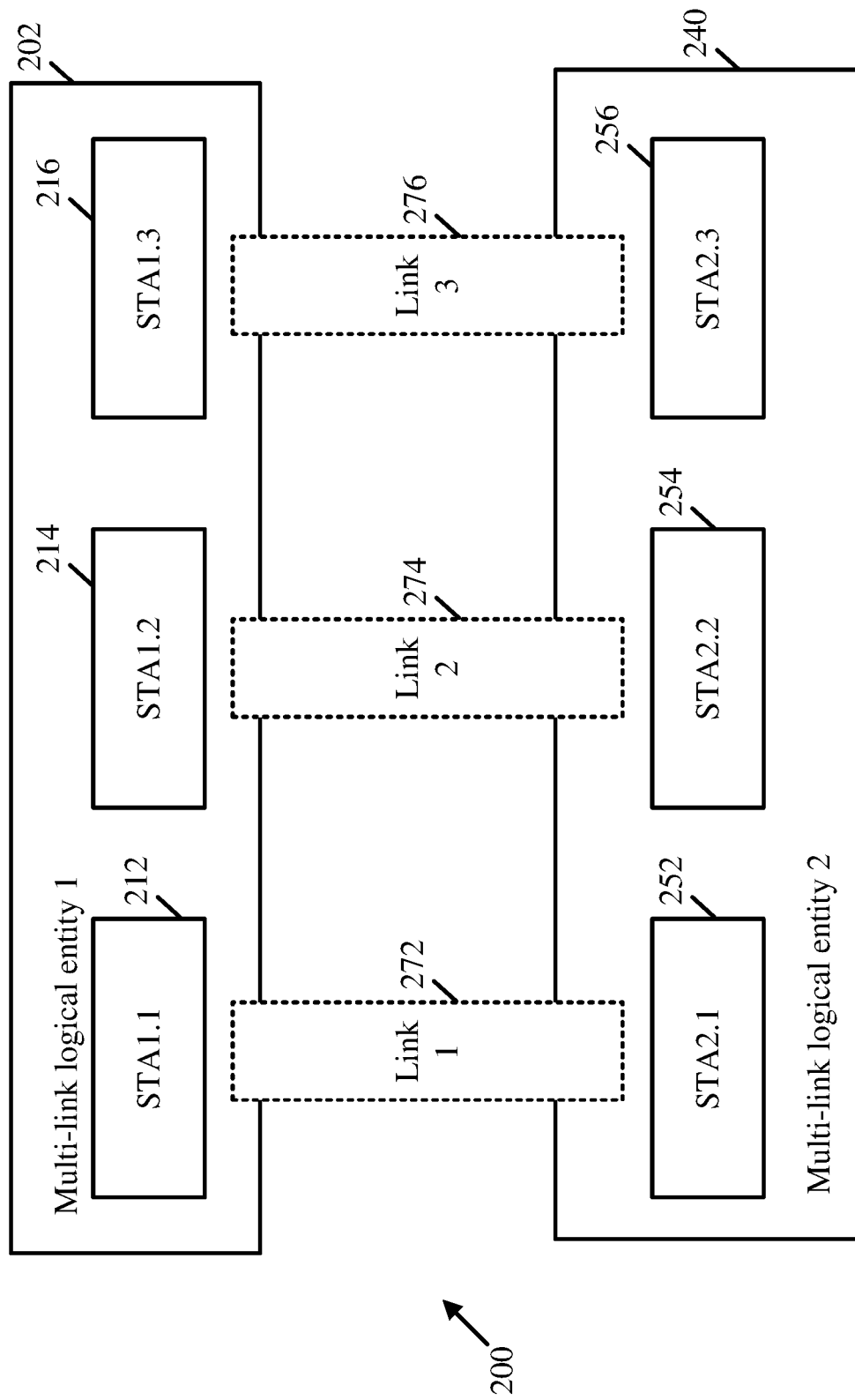
FIG. 2 is a schematic illustration of a multi-link communication scheme, which may be implemented in accordance with some demonstrative aspects.

Reference is made to FIG. 2, which schematically illustrates a multi-link communication scheme 200, which may be implemented in accordance with some demonstrative aspects.

As shown in FIG. 2, a first multi-link logical entity 202 ("multi-link logical entity 1"), e.g., a first MLD, may include a plurality of STAs, e.g., including a STA 212, a STA 214, and a STA 216. In one example, MLD 131 (FIG. 1) may perform one or more operations, one or more functionalities, the role of, and/or the functionality of, multi-link logical entity 202.

As shown in FIG. 2, a second multi-link logical entity 240 ("multi-link logical entity 2"), e.g., a second MLD, may include a plurality of STAs, e.g., including a STA 252, a STA 254, and a STA 256. In one example, MLD 151 (FIG. 1) may perform one or more operations, one or more functionalities, the role of, and/or the functionality of, multi-link logical entity 240.

As shown in FIG. 2, multi-link logical entity 202 and multi-link logical entity 240 may be configured to form, setup and/or communicate over a plurality of links, for example, including a link 272 between STA 212 and STA 252, a link 274 between STA 214 and STA 254, and/or a link 276 between STA 216 and STA 256.

Figure 3:
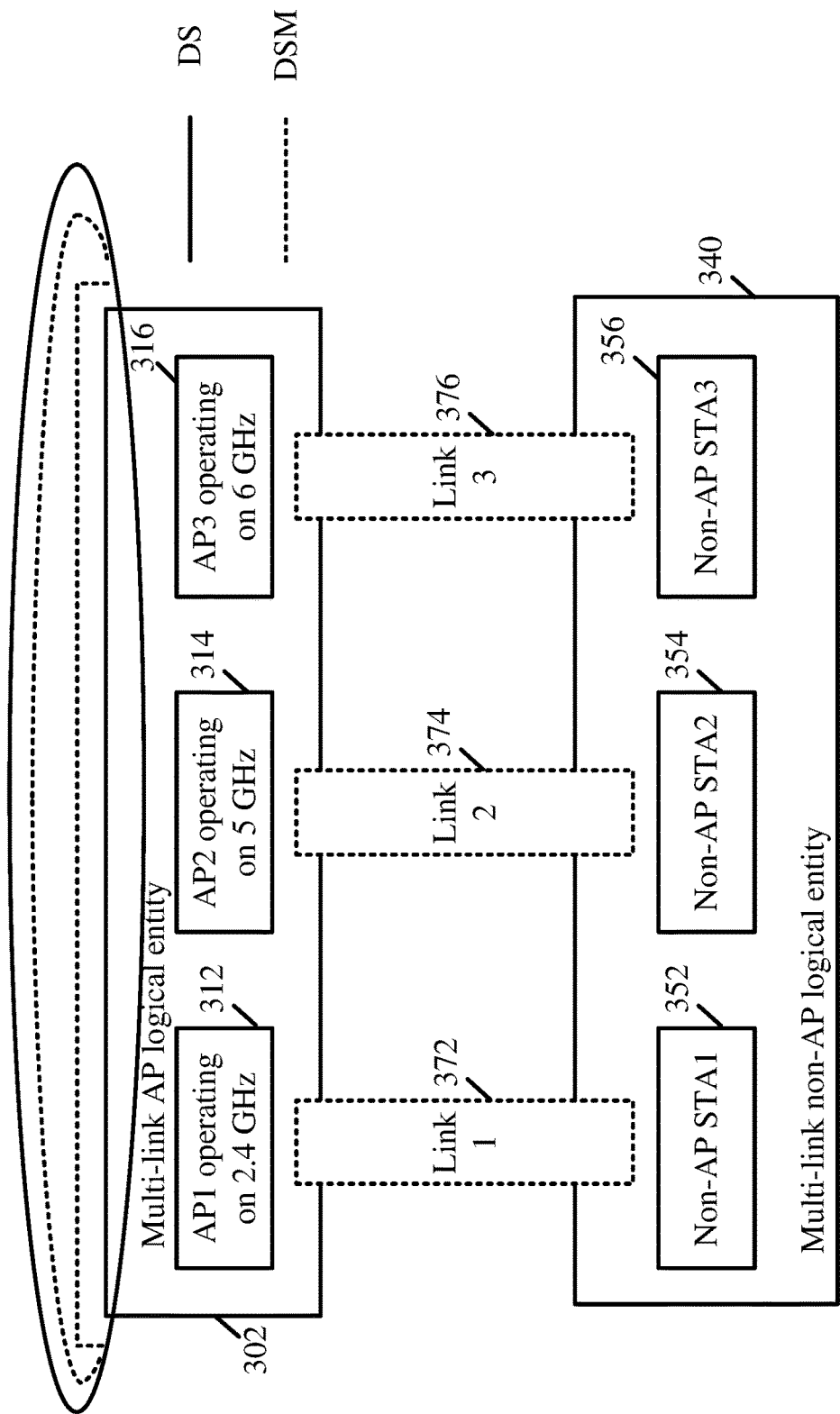
FIG. 3 is a schematic illustration of a multi-link communication scheme, which may be implemented in accordance with some demonstrative aspects.

Reference is made to FIG. 3, which schematically illustrates a multi-link communication scheme 300, which may be implemented in accordance with some demonstrative aspects.

As shown in FIG. 3, a multi-link AP logical entity 302, e.g., an AP MLD, may include a plurality of AP STAs, e.g., including an AP STA 312, an AP STA 314, and an AP STA 316. In one example, MLD 131 (FIG. 1) may perform one or more operations, one or more functionalities, the role of, and/or the functionality of, multi-link AP logical entity 302.

As shown in FIG. 3, a multi-link non-AP logical entity 340, e.g., a non-AP MLD, may include a plurality of non-AP STAs, e.g., including a non-AP STA 352, a non-AP STA 354, and a non-AP STA 356. In one example, MLD 151 (FIG. 1) may perform one or more operations, one or more functionalities, the role of, and/or the functionality of, multi-link non-AP logical entity 340.

As shown in FIG. 3, multi-link AP logical entity 302 and multi-link non-A logical entity 340 may be configured to form, setup and/or communicate over a plurality of links, for example, including a link 372 between AP STA 312 and non-AP STA 352, a link 374 between AP STA 314 and non-AP STA 354, and/or a link 376 between AP STA 316 and non-AP STA 356.

For example, as shown in FIG. 3, multi-link AP logical entity 302 may include a multi-band AP MLD, which may be configured to communicate over a plurality of wireless communication frequency bands. For example, as shown in FIG. 3, AP STA 312 may be configured to communicate over a 2.4 Ghz frequency band, AP STA 314 may be configured to communicate over a 5 Ghz frequency band, and/or AP STA 316 may be configured to communicate over a 6 Ghz frequency band. In other aspects, AP STA 312, AP STA 314, and/or AP STA 216, may be configured to communicate over any other additional or alternative wireless communication frequency bands.

Referring back to FIG. 1, in some demonstrative aspects, devices 102 and/or 140 may be configured to support a technical solution for a non-AP STA, e.g., a STA of STAs 153, to discover an AP MLD, e.g., MLD 133. For example, an AP of MLD 131, e.g., each AP of MLD 131, may be configured to transmit one or more beacon frames.

In some demonstrative aspects, a beacon frame transmitted by an AP STA may include, for example, a description of capabilities, operation elements, and/or any other information, relating to the AP STA.

In some demonstrative aspects, the beacon frame transmitted by the AP STA may include information e.g., in the form of a basic description, of one or more other AP STAs of the same MLD that are collocated, e.g., a report in a Reduced Neighbor Report (RNR) element, or any information. In one example, e.g., in some cases, the description of the other APs may be complete and include all the capabilities, and/or operation elements of the other APs.

In some demonstrative aspects, devices 102 and/or 140 may be configured to generate, transmit, receive and/or process one or more frames including a Multi-Link element (MLE), which may be configured to report and/or describe multiple APs of an AP MLD, e.g., as described below.

For example, the MLE may have a structure, which may be based on, compatible with, and/or similar to, a structure of a multiple Basic Service Set Identifier (BSSID) element, e.g., with one or more optional subelements.

For example, the MLE may include a profile subelement (also referred to as "AP profile subelement") for a reported AP. In one example, the MLE may include an AP profile subelement for each reported AP. For example, the reported AP may be identified bay a unique link identifier (ID). For example, the AP profile subelement for a reported AP may include variable number of elements describing this reported AP.

For example, the AP profile subelement for a reported AP may optionally include a Non-Inheritance element. For example, when included in the AP Profile subelement for an AP, the Non-Inheritance element may appear as the last element in the profile. For example, the Non-Inheritance element may carry a list of elements that are not inherited by this reported AP from the reporting AP.

In some demonstrative aspects, for example, in some implementations, in some use cases, scenarios, and/or deployment, an AP of an AP MLD may transmit beacon frames, which may already carry a reduced RNR, which may include a description of other APs of the same AP MLD.

In some demonstrative aspects, for example, in some implementations, in some use cases, scenarios, and/or deployment, some APs, e.g., most APs, may only need to include the RNR to describe only partial information for other APs of the same MLD.

In some demonstrative aspects, for example, in some implementations, in some use cases, scenarios, and/or deployment, an AP of an AP MLD may be allowed to include a multi-link element in a frame, e.g., a beacon frame, for example, in order to provide the complete information of one or more other APs of the same AP MLD.

In some demonstrative embodiments, there may be a need to provide a technical solution to define whether or not partial information can also be provided in a multi-link element for a reported AP, e.g., another AP of the same AP MLD.

In some demonstrative aspects, it may be defined whether a multi-link element for a reported AP should be required to carry the complete information that is usually carried in beacons/probe responses when sent by that reported AP; or whether the multi-link element would be allowed to provide partial information of the reported AP, for example, by providing for the reported AP information, which may not include all the elements that are usually carried in beacons/probe responses when sent by that reported AP.

In some demonstrative aspects, controller 124 may be configured to cause a reporting STA, e.g., STA 135, of an MLD, e.g., MLD 131, including a plurality of STAs, e.g., STAs 133, to generate a multi-link element including one or more STA profile subelements for one or more reported STAs of the MLD, respectively, e.g., as described below.

In some demonstrative aspects, a STA profile subelement corresponding to a reported STA may include one or more elements of information corresponding to the reported STA.

In some demonstrative aspects, controller 124 may be configured to cause the reporting STA, e.g., STA 135, to set a field in the STA profile subelement corresponding to the reported STA to indicate whether or not the STA profile subelement corresponding to the reported STA is to be interpreted to provide all information corresponding to the reported STA, e.g., as described below.

In some demonstrative aspects, for example, controller 124 may be configured to cause STA 135 to generate a multi-link element including a STA profile subelement for STA 137, and/or a STA profile subelement for STA 139.

For example, the STA profile subelement for STA 137 may include one or more elements of information corresponding to STA 137, and a field to indicate whether or not the STA profile subelement for STA 137 is to be interpreted to provide all information corresponding to the STA 137.

For example, the STA profile subelement for STA 139 may include one or more elements of information corresponding to STA 139, and a field to indicate whether or not the STA profile subelement for STA 139 is to be interpreted to provide all information corresponding to the STA 139.

In some demonstrative aspects, controller 124 may be configured to cause the reporting STA, e.g., STA 135, to transmit a frame including the multi-link element.

In some demonstrative aspects, the reporting STA may include a reporting AP of an AP MLD including a plurality of APs. For example, controller 124 may be configured to cause MLD 131 to operate as an AP MLD, and STA 135 to operate as an AP STA, e.g., as described above.

In some demonstrative aspects, the frame may include a beacon frame. For example, controller 124 may be configured to cause the reporting AP STA, e.g., STA 135, to transmit a beacon frame including the multi-link element.

In some demonstrative aspects, the frame may include a probe response frame or an association/reassociation response frame. For example, controller 124 may be configured to cause the reporting AP STA, e.g., STA 135, to transmit a probe response frame or an association/reassociation response frame including the multi-link element, for example, in response to a probe request frame or an association/reassociation request frame from a non-AP STA, e.g., from a non-AP STA of MLD 151.

In other aspects, controller 124 may be configured to cause the reporting AP STA, e.g., STA 135, to transmit the multi-link element as part of any other type of frame.

In some demonstrative aspects, the reporting STA may include a reporting non-AP STA of a non-AP MLD including a plurality of non-AP STAs. For example, controller 124 may be configured to cause MLD 131 to operate as a non-AP MLD, and STA 135 to operate as a non-AP STA, e.g., as described above.

In some demonstrative aspects, the frame may include a probe request frame or an association/reassociation request frame. For example, controller 124 may be configured to cause the reporting non-AP STA, e.g., STA 135, to transmit a probe request frame or an association/reassociation request frame including the multi-link element, for example, an AP STA of an AP MLD, e.g., to a non-AP STA of MLD 151.

In other aspects, controller 124 may be configured to cause the reporting non-AP STA, e.g., STA 135, to transmit the multi-link element as part of any other type of frame.

In some demonstrative aspects, controller 124 may be configured to cause the reporting STA, e.g., STA 135, to set the field in the STA profile subelement corresponding to the reported STA to a first predefined value or a second predefined value, e.g., as described below.

In some demonstrative aspects, the first predefined value may be configured to indicate that the STA profile subelement corresponding to the reported STA is to be interpreted to provide all information corresponding to the reported STA, e.g., as described below.

In some demonstrative aspects, the first predefined value may be configured to indicate that the STA profile subelement corresponding to the reported STA is to be interpreted to provide all information that would be included in the frame, for example, if transmitted by the reported STA, e.g., except for one or more predefined elements, e.g., as described below.

In some demonstrative aspects, the first predefined value may be configured to indicate that any element, which is not included in the STA profile subelement corresponding to the reported STA, and which is not listed in a non-inheritance element, is to be inherited from the reporting STA, e.g., as described below.

In some demonstrative aspects, the second predefined value may be configured to indicate that the STA profile subelement corresponding to the reported STA is to be interpreted to provide only partial information corresponding to the reported STA, e.g., as described below.

In some demonstrative aspects, the second predefined value may be configured to indicate that one or more elements, which are not included in the STA profile subelement corresponding to the reported STA, are not to be inherited from the reporting STA, e.g., as described below.

In some demonstrative aspects, controller 124 may be configured to cause the reporting STA, e.g., STA 135, to set to 1 the field in the STA profile subelement corresponding to the reported STA, for example, when the STA profile subelement corresponding to the reported STA is to be interpreted to provide all information corresponding to the reported STA, e.g., as described below.

In some demonstrative aspects, controller 124 may be configured to cause the reporting STA, e.g., STA 135, to set to 0 the field in the STA profile subelement corresponding to the reported STA, for example, when the STA profile subelement corresponding to the reported STA is to be interpreted to provide only partial information corresponding to the reported STA, e.g., as described below.

In some demonstrative aspects, the field in the STA profile subelement corresponding to the reported AP may include a single-bit field. In other aspects, any other field with any other length may be used.

In some demonstrative aspects, devices 102 and/or 140 may be configured to generate, transmit, receive and/or process a multi-link element according to one or more rules, for example, including one or more, e.g., some or all, of the following rules:
- a Multi-link element, when sent by an AP of an AP MLD in a beacon frame or unsolicited probe response frame, may include an AP profile (may also be referred to as "STA profile") for each of the other APs that are collocated with the AP and that are part of the same AP MLD.
- Each AP/STA profile representing a reported AP in a multi-link (ML) element may include all the elements that the reported AP includes in a beacon frame it transmits (e.g., except for a TIM element, a TWT elements, TSF, and/or any other predefined element), or only a partial number of elements.
- In such a case, a non-inheritance element shall be included in the AP/STA profile, for example, to explicitly identify the elements that are inherited and the ones that are not present and not inherited (value is still unknown).

In some demonstrative aspects, the multi-link element may be configured to support a reporting AP in an ability to include only some partial information, e.g., possibly as low as a single element, and not provide any information about other elements. For example, requiring the reporting AP to include a non-inheritance element may result in overhead, e.g., a huge overhead, for example, if the non-inheritance element is to include the element ID of all the other elements (more than 256 bytes).

In some demonstrative aspects, the multi-link element may include a field (also referred to as "inheritance field" or "partial information indication field"), which may be configured to indicate whether or not the STA profile subelement for a reported STA in the multi-link element is to be interpreted to provide all information corresponding to the reported STA.

In some demonstrative aspects, the partial information indication field may be included as part of the STA profile subelement. For example, including the partial information indication field as part of the STA profile subelement may support a solution to apply the indication of the partial information indication field, for example, with respect to a particular AP/STA in the ML element to which the STA profile subelement corresponds.

In one example, the inheritance field may be included as part of the non-inheritance element. In other aspects the partial information indication field may be included as part of any other element or subelement.

In some demonstrative aspects, the partial information indication field may be included as part of a common portion of the multi-link element. For example, including the partial information indication field as part of the common portion of the multi-link element may support a solution to apply the indication of the partial information indication field, for example, with respect to all AP/STAs in the multi-link element.

In some demonstrative aspects, the partial information indication field may be set, e.g., according to the following rules:
- set to 1 if inheritance is applied and the STA profile subelement for the reported STA is to be interpreted to provide all information corresponding to the reported STA. This means, for example, that the elements that are not present in the AP/STA profile are inherited from the reporting AP, e.g., unless the element ID is listed in the non-inheritance element in the AP/STA profile.
- Set to 0 if inheritance is not applied and the STA profile subelement for the reported STA is to be interpreted to provide only partial information corresponding to the reported STA. This means, for example, that the elements that are not present in the AP/STA profile are not inherited from the reporting AP, and the non-inheritance element does not need to be included. If not present, the element is simply not provided to the receiver.

In some demonstrative aspects, devices 102 and/or 140 may be configured to generate, transmit, receive and/or process a multi-link element according to one or more rules, for example, including one or more, e.g., some or all, of the following rules:
- a Multi-link element, when sent by an AP of an AP MLD in a beacon frame or unsolicited probe response frame, shall include an AP profile (or STA profile—name can change) for each of the other APs that are collocated with the AP and that are part of the same AP MLD.
- Each AP/STA profile representing a reported AP in an ML element shall include all the elements that the reported AP includes in a beacon frame it transmits (e.g., except TIM element, TWT elements, TSF, and/or any other predefined elements).
- Each AP/STA profile representing a reported STA in an ML element in an association/reassociation request frame shall include all the elements that the reported STA includes in a probe request or a association/reassociation frame it transmits.
- In such a case, the non-inheritance element does not need to be included in the AP/STA profile, as it is already explicit that either an element is present in the AP/STA profile and this element is the right one for the reported AP, or the element is not present and the element is inherited from the reporting AP.

In some demonstrative aspects, devices 102 and/or 140 may be configured to generate, transmit, receive and/or process a multi-link element in association and/or reassociation requests according to one or more rules, for example, including one or more, e.g., some or all, of the following rules:

ML element shall be present to describe all the STAs on the links to be setup, and includes the complete information for those.

There is a 1:1 mapping between a STA and a link, tailored toward the link information acquired from earlier discovery. For example, a single radio MLD setting up an ML with an AP MLD with 3 links, may have a description of 3 STAs, e.g., one for each link.

The common part of the non-AP MLD may contain capabilities whether the non-AP MLD is a single radio or dual radio.

In some demonstrative aspects, probe requests and/or reposes may be communicated as probe requests and/or reposes of a first category (regular probe requests and/or reposes). For example, communication of regular probe request/probe responses may include a probe request that contains mainly information on the link on which it is transmitted, and generates a regular probe response that contains the RNR, for example, including reduced, e.g., minimal, information, for example, for a basic discovery.

In some demonstrative aspects, devices 102 and/or 140 may be configured to generate, transmit, receive and/or process a multi-link element in the regular probe requests and/or probe responses according to one or more rules, for example, including one or more, e.g., some or all, of the following rules:

In regular probe requests:
STA only needs to provide STA information on that link
STA could indicate that it is part of non-AP MLD In some demonstrative aspects, probe requests and/or reposes may be communicated as probe requests and/or reposes of a second category (MLD probe requests and/or reposes). For example, communication of MLD probe request/probe responses may include a probe request that contains STA MLD information and requests complete MLD info on multiple links that the STA supports, and a probe response that contains complete information on an AP MLD, for example, for all links supported by the STA, and/or or one or more specific rules.

In some demonstrative aspects, devices 102 and/or 140 may be configured to generate, transmit, receive and/or process a multi-link element in the MLD probe requests and/or probe responses according to one or more rules, for example, including one or more, e.g., some or all, of the following rules:

In MLD probe requests:
STA provides STA information for all the links that the targeted AP supports, e.g., and that the STA supports as well.
Uses the Multi-link element to include information on other STAs than the one transmitting the request.

Figure 5:
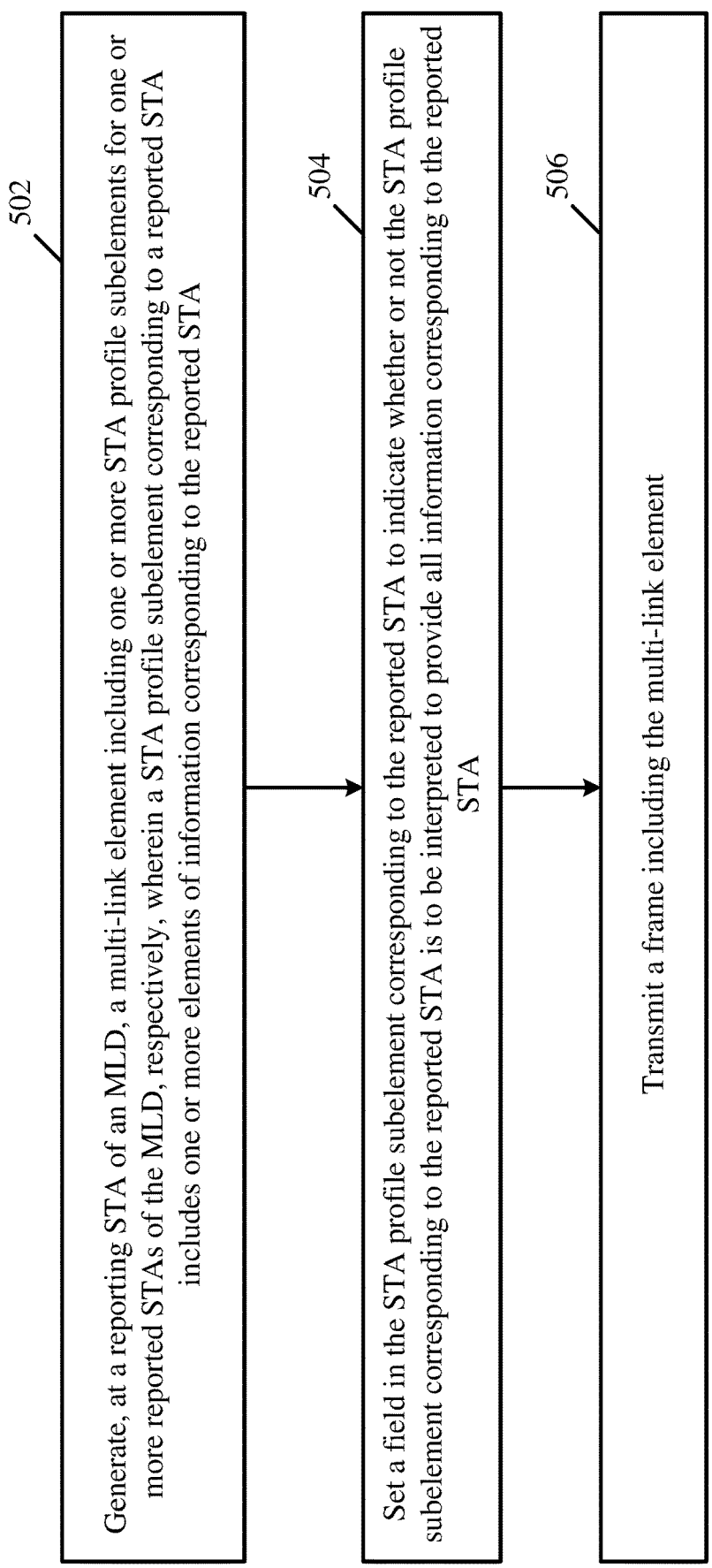
FIG. 5 is a schematic flow-chart illustration of a method of communicating a multi-link element, in accordance with some demonstrative aspects.

Reference is made to FIG. 5, which schematically illustrates elements of a frame 500, in accordance with some demonstrative aspects. For example, controller 124 (FIG. 1) may be configured to cause a reporting STA, e.g., STA 135 (FIG. 1), to transmit frame 500.

In some demonstrative aspects, frame 400 may be transmitted by a reporting AP STA of an AP MLD. For example, controller 124 (FIG. 1) may be configured to cause a reporting AP STA, e.g., STA 135 (FIG. 1), to transmit frame 400.

In some demonstrative aspects, frame 400 may include a beacon frame.

In some demonstrative aspects, frame 400 may include a probe response frame or an association/reassociation response frame.

In some demonstrative aspects, frame 400 may be transmitted by a reporting non-AP STA of a non-AP MLD. For example, controller 124 (FIG. 1) may be configured to cause a reporting non-AP STA, e.g., STA 135 (FIG. 1), to transmit frame 400.

In some demonstrative aspects, frame 400 may include a probe request frame or an association/reassociation request frame.

In other aspects, frame 400 may include any other type of frame.

Figure 4:
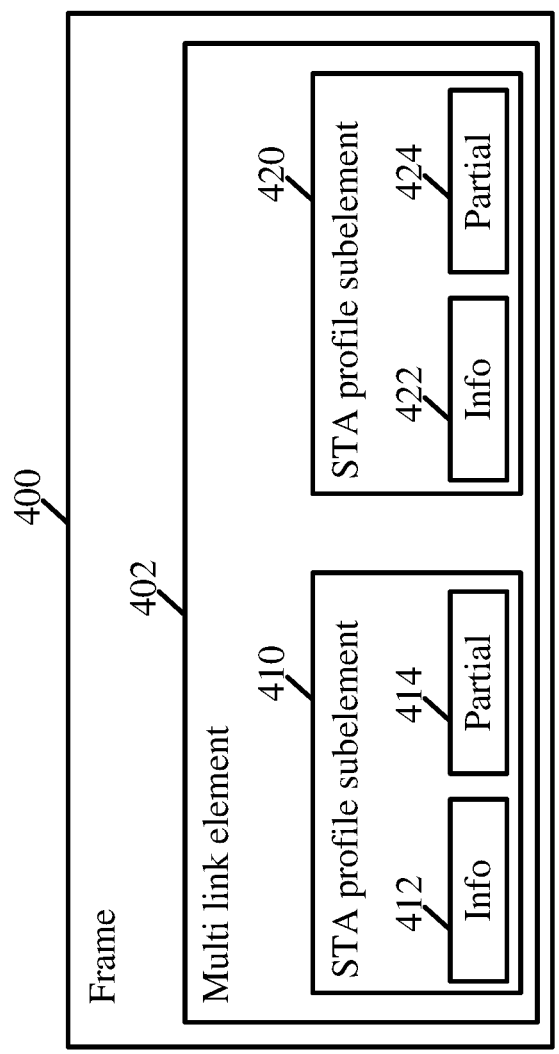
FIG. 4 is a schematic illustration of elements of a frame, in accordance with some demonstrative aspects.

In some demonstrative aspects, as shown in FIG. 4, frame 400 may include at least one multi-link element 402.

In some demonstrative aspects, as shown in FIG. 4, multi-link element 402 may include one or more STA profile subelements for one or more reported STAs, e.g., including a first STA profile subelement 410 for a first reported STA, and/or a first STA profile subelement 420 for a first reported STA.

In some demonstrative aspects, STA profile subelement 410 may include one or more elements of information 412 corresponding to the first reported STA, and a field 414 to indicate whether or not the STA profile subelement 410 is to be interpreted to provide all information corresponding to the first reported STA.

In some demonstrative aspects, STA profile subelement 420 may include one or more elements of information 422 corresponding to the second reported STA, and a field 424 to indicate whether or not the STA profile subelement 420 is to be interpreted to provide all information corresponding to the second reported STA.

In some demonstrative aspects, the field 414 and/or the field 424 may include single-bit fields, e.g., as described above. In other aspects, the fields 414 and/or 424 may include any other fields of any other length.

In some demonstrative aspects, the field 414 and/or the field 424 may be set to a first predefined value, e.g., "1", or a second predefined value, e.g., "0".

For example, the field 414 may be set to the first predefined value, e.g., to "1", to indicate that the STA profile subelement 410 is to be interpreted to provide all information corresponding to the first reported STA.

For example, the field 414 may be set to the second predefined value, e.g., to "0", to that the STA profile subelement 410 is to be interpreted to provide only partial information corresponding to the first reported STA.

For example, the field 424 may be set to the first predefined value, e.g., to "1", to indicate that the STA profile subelement 420 is to be interpreted to provide all information corresponding to the second reported STA.

For example, the field 424 may be set to the second predefined value, e.g., to "0", to that the STA profile subelement 420 is to be interpreted to provide only partial information corresponding to the second reported STA.

In one example, both STA profile subelement 410 and STA profile subelement 420 may be configured to provide all information corresponding to the first and second reported STAs, respectively. According to this example, both the field 414 and the field 424 may be set to the value 1, e.g., by the reporting STA 135 (FIG. 1).

In another example, both STA profile subelement 410 and STA profile subelement 420 may be configured to provide only partial information corresponding to the first and second reported STAs, respectively. According to this example, both the field 414 and the field 424 may be set to the value 0, e.g., by the reporting STA 135 (FIG. 1).

In another example, STA profile subelement 410 may be configured to provide all information corresponding to the first reported STA, and STA profile subelement 420 may be configured to provide only partial information corresponding to the second reported STA. According to this example, the field 414 may be set to the value 1 and the field 424 may be set to the value 0, e.g., by the reporting STA 135 (FIG. 1).

In another example, STA profile subelement 410 may be configured to provide only partial information corresponding to the first reported STA, and STA profile subelement 420 may be configured to provide all information corresponding to the second reported STA. According to this example, the field 414 may be set to the value 0 and the field 424 may be set to the value 1, e.g., by the reporting STA 135 (FIG. 1).

Reference is made to FIG. 5, which schematically illustrates a method of transmitting a multi-link element. For example, one or more of the operations of the method of FIG. 5 may be performed by one or more elements of a system, e.g., system 100 (FIG. 1), for example, one or more wireless devices, e.g., device 102 (FIG. 1), and/or device 140 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 502, the method may include generating, by a reporting STA of an MLD, a multi-link element including one or more STA profile subelements for one or more reported STAs of the MLD, respectively, wherein a STA profile subelement corresponding to a reported STA includes one or more elements of information corresponding to the reported STA. For example, controller 124 (FIG. 1) may be configured to cause, trigger, and/or control reporting STA 135 (FIG. 1) to generate the multi-link element 402 (FIG. 4) including the STA profile subelement 410 (FIG. 4) and/or the STA profile subelement 420 (FIG. 4), e.g., as described above.

As indicated at block 504, the method may include setting a field in the STA profile subelement corresponding to the reported STA to indicate whether or not the STA profile subelement corresponding to the reported STA is to be interpreted to provide all information corresponding to the reported STA. For example, controller 124 (FIG. 1) may be configured to cause, trigger, and/or control reporting STA 135 (FIG. 1) to set the field 414 (FIG. 4) and/or the field 424 (FIG. 4), e.g., as described above.

As indicated at block 506, the method may include transmitting a frame including the multi-link element. For example, controller 124 (FIG. 1) may be configured to cause, trigger, and/or control reporting STA 135 (FIG. 1) to transmit frame 400 (FIG. 4), e.g., as described above.

Figure 6:
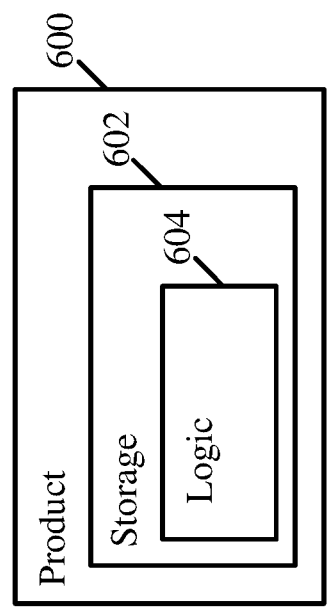
FIG. 6 is a schematic illustration of a product of manufacture, in accordance with some demonstrative aspects.

Reference is made to FIG. 6, which schematically illustrates a product of manufacture 600, in accordance with some demonstrative aspects. Product 600 may include one or more tangible computer-readable ("machine-readable") non-transitory storage media 602, which may include computer-executable instructions, e.g., implemented by logic 604, operable to, when executed by at least one computer processor, enable the at least one computer processor to implement one or more operations at device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to perform, trigger and/or implement one or more operations and/or functionalities, and/or to perform, trigger and/or implement one or more operations and/or functionalities described with reference to the FIGS. 1, 2, 3, 4, and/or 5, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 600 and/or machine readable storage media 602 may include one or more types of computer-readable storage media capable of storing data, including volatile memory, non-volatile memory, removable or non-removable memory, erasable or non-erasable memory, writeable or rewriteable memory, and the like. For example, machine readable storage media 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, lowlevel, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes an apparatus comprising logic and circuitry configured to cause a reporting wireless communication station (STA) of a Multi-Link Device (MLD) comprising a plurality of STAs to generate a multi-link element comprising one or more STA profile subelements for one or more reported STAs of the MLD, respectively, wherein a STA profile subelement corresponding to a reported STA comprises one or more elements of information corresponding to the reported STA; set a field in the STA profile subelement corresponding to the reported STA to indicate whether or not the STA profile subelement corresponding to the reported STA is to be interpreted to provide all information corresponding to the reported STA; and transmit a frame comprising the multi-link element.

Example 2 includes the subject matter of Example 1, and optionally, wherein the apparatus is configured to cause the reporting STA to set the field in the STA profile subelement corresponding to the reported STA to a first predefined value or a second predefined value, the first predefined value to indicate that the STA profile subelement corresponding to the reported STA is to be interpreted to provide all information corresponding to the reported STA, the second predefined value to indicate that the STA profile subelement corresponding to the reported STA is to be interpreted to provide only partial information corresponding to the reported STA.

Example 3 includes the subject matter of Example 2, and optionally, wherein the first predefined value is to indicate that the STA profile subelement corresponding to the reported STA is to be interpreted to provide all information that would be included in the frame if transmitted by the reported STA, except for one or more predefined elements.

Example 4 includes the subject matter of Example 2 or 3, and optionally, wherein the first predefined value is to indicate that any element, which is not included in the STA profile subelement corresponding to the reported STA, and which is not listed in a non-inheritance element, is to be inherited from the reporting STA.

Example 5 includes the subject matter of any one of Examples 2-4, and optionally, wherein the second predefined value is to indicate that one or more elements, which are not included in the STA profile subelement corresponding to the reported STA, are not to be inherited from the reporting STA.

Example 6 includes the subject matter of any one of Examples 1-5, and optionally, wherein the apparatus is configured to cause the reporting STA to set to 1 the field in the STA profile subelement corresponding to the reported STA, when the STA profile subelement corresponding to the reported STA is to be interpreted to provide all information corresponding to the reported STA.

Example 7 includes the subject matter of any one of Examples 1-6, and optionally, wherein the apparatus is configured to cause the reporting STA to set to 0 the field in the STA profile subelement corresponding to the reported STA, when the STA profile subelement corresponding to the reported STA is to be interpreted to provide only partial information corresponding to the reported STA.

Example 8 includes the subject matter of any one of Examples 1-7, and optionally, wherein the field in the STA profile subelement corresponding to the reported AP comprises a single-bit field.

Example 9 includes the subject matter of any one of Examples 1-8, and optionally, wherein the reporting STA comprises a reporting Access Point (AP) of an AP MLD comprising a plurality of APs.

Example 10 includes the subject matter of Example 9, and optionally, wherein the frame comprises a beacon frame.

Example 11 includes the subject matter of Example 9, and optionally, wherein the frame comprises a probe response frame or an association/reassociation response frame.

Example 12 includes the subject matter of any one of Examples 1-8, and optionally, wherein the reporting STA comprises a reporting non-Access Point (non-AP) STA of a non-AP MLD comprising a plurality of non-AP STAs.

Example 13 includes the subject matter of Example 12, and optionally, wherein the frame comprises a probe request frame or an association/reassociation request frame.

Example 14 includes the subject matter of any one of Examples 1-13, and optionally, comprising a radio to transmit the frame.

Example 15 includes the subject matter of Example 14, and optionally, comprising one or more antennas connected to the radio, and a processor to execute instructions of an operating system of the MLD.

Example 16 comprises an apparatus comprising means for executing any of the described operations of Examples 1-15.

Example 17 comprises a product comprising one or more tangible computer-readable non-transitory storage media comprising computer-executable instructions operable to, when executed by at least one processor, enable the at least one processor to cause a computing device to perform any of the described operations of Examples 1-15.

Example 18 comprises an apparatus comprising: a memory interface; and processing circuitry configured to: perform any of the described operations of Examples 1-15.

Example 19 comprises a method comprising any of the described operations of Examples 1-15.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a processor comprising logic and circuitry configured to cause a reporting wireless communication station (STA) of a Multi-Link Device (MLD) comprising a plurality of STAs to:
generate a multi-link element comprising one or more STA profile subelements for one or more reported STAs of the MLD, respectively, wherein a STA profile subelement corresponding to a reported STA comprises one or more elements of information corresponding to the reported STA, wherein a field in the STA profile subelement corresponding to the reported STA is set to indicate whether or not the STA profile subelement corresponding to the reported STA is to be interpreted to provide all information corresponding to the reported STA, wherein the field in the STA profile subelement corresponding to the reported STA is configured to be set to a first predefined value or a second predefined value, the first predefined value to indicate that the STA profile subelement corresponding to the reported STA is to be interpreted to provide all information corresponding to the reported STA, the second predefined value to indicate that the STA profile subelement corresponding to the reported STA is to be interpreted to provide only partial information corresponding to the reported STA; and transmit a frame comprising the multi-link element; and a memory to store information processed by the processor.

2. The apparatus of claim 1 configured to cause the reporting STA to set the field in the STA profile subelement corresponding to the reported STA to the first predefined value to indicate that the STA profile subelement corresponding to the reported STA is to be interpreted to provide all information that would be included in the frame if transmitted by the reported STA, except for one or more predefined elements.

3. The apparatus of claim 1 configured to cause the reporting STA to set the field in the STA profile subelement corresponding to the reported STA to the second predefined value to indicate that any element, which is not included in the STA profile subelement corresponding to the reported STA, and which is not listed in a non-inheritance element, is to be inherited from the reporting STA.

4. The apparatus of claim 1 configured to cause the reporting STA to set to 1 the field in the STA profile subelement corresponding to the reported STA, when the STA profile subelement corresponding to the reported STA is to be interpreted to provide all information corresponding to the reported STA.

5. The apparatus of claim 1 configured to cause the reporting STA to set to 0 the field in the STA profile subelement corresponding to the reported STA, when the STA profile subelement corresponding to the reported STA is to be interpreted to provide only partial information corresponding to the reported STA.

6. The apparatus of claim 1, wherein the field in the STA profile subelement corresponding to the reported AP comprises a single-bit field.

7. The apparatus of claim 1, wherein the reporting STA comprises a reporting Access Point (AP) of an AP MLD comprising a plurality of APs.

8. The apparatus of claim 7, wherein the frame comprises a probe response frame, or an association or reassociation response frame.

9. The apparatus of claim 7, wherein the frame comprises a beacon frame.

10. The apparatus of claim 1, wherein the reporting STA comprises a reporting non-Access Point (non-AP) STA of a non-AP MLD comprising a plurality of non-AP STAs.

11. The apparatus of claim 10, wherein the frame comprises an association or reassociation request frame.

12. The apparatus of claim 11 configured to cause the reporting non-AP STA to configure the multi-link element of the association or reassociation request frame to include the one or more STA profile subelements comprising complete information for one or more respective non-AP reported STAs for which a link is to be setup.

13. The apparatus of claim 1 comprising a radio, wherein the processor is configured to cause the radio to transmit the frame.

14. The apparatus of claim 13 comprising one or more antennas connected to the radio, and another processor to execute instructions of an operating system of the MLD.

15. A product comprising one or more tangible computer-readable non-transitory storage media comprising computer-executable instructions operable to, when executed by at least one processor, enable the at least one processor to cause a reporting wireless communication station (STA) of a Multi-Link Device (MLD) comprising a plurality of STAs to:

generate a multi-link element comprising one or more STA profile subelements for one or more reported STAs of the MLD, respectively, wherein a STA profile subelement corresponding to a reported STA comprises one or more elements of information corresponding to the reported STA, wherein a field in the STA profile subelement corresponding to the reported STA is set to indicate whether or not the STA profile subelement corresponding to the reported STA is to be interpreted to provide all information corresponding to the reported STA, wherein the field in the STA profile subelement corresponding to the reported STA is configured to be set to a first predefined value or a second predefined value, the first predefined value to indicate that the STA profile subelement corresponding to the reported STA is to be interpreted to provide all information corresponding to the reported STA, the second predefined value to indicate that the STA profile subelement corresponding to the reported STA is to be interpreted to provide only partial information corresponding to the reported STA; and transmit a frame comprising the multi-link element.

16. The product of claim 15, wherein the instructions, when executed, cause the reporting STA to set the field in the STA profile subelement corresponding to the reported STA to the first predefined value to indicate that the STA profile subelement corresponding to the reported STA is to be interpreted to provide all information that would be included in the frame if transmitted by the reported STA, except for one or more predefined elements.

17. The product of claim 15, wherein the instructions, when executed, cause the reporting STA to set the field in the STA profile subelement corresponding to the reported STA to the second predefined value to indicate that any element, which is not included in the STA profile subelement corresponding to the reported STA, and which is not listed in a non-inheritance element, is to be inherited from the reporting STA.

18. The product of claim 15, wherein the instructions, when executed, cause the reporting STA to set to 1 the field in the STA profile subelement corresponding to the reported STA, when the STA profile subelement corresponding to the reported STA is to be interpreted to provide all information corresponding to the reported STA.

19. The product of claim 15, wherein the instructions, when executed, cause the reporting STA to set to 0 the field in the STA profile subelement corresponding to the reported STA, when the STA profile subelement corresponding to the reported STA is to be interpreted to provide only partial information corresponding to the reported STA.

20. The product of claim 15, wherein the reporting STA comprises a reporting Access Point (AP) of an AP MLD comprising a plurality of APs.

21. The product of claim 15, wherein the reporting STA comprises a reporting non-Access Point (non-AP) STA of a non-AP MLD comprising a plurality of non-AP STAs.

22. An apparatus for a reporting wireless communication station (STA) of a Multi-Link Device (MLD) comprising a plurality of STAs, the apparatus comprising:

means for generating a multi-link element comprising one or more STA profile subelements for one or more reported STAs of the MLD, respectively, wherein a STA profile subelement corresponding to a reported STA comprises one or more elements of information corresponding to the reported STA, wherein a field in the STA profile subelement corresponding to the reported STA is set to indicate whether or not the STA profile subelement corresponding to the reported STA is to be interpreted to provide all information corresponding to the reported STA, wherein the field in the STA profile subelement corresponding to the reported STA is configured to be set to a first predefined value or a second predefined value, the first predefined value to indicate that the STA profile subelement corresponding to the reported STA is to be interpreted to provide all information corresponding to the reported STA, the second predefined value to indicate that the STA profile subelement corresponding to the reported STA is to be interpreted to provide only partial information corresponding to the reported STA; and means for causing the reporting STA to transmit a frame comprising the multi-link element.

23. The apparatus of claim 22 comprising means for causing the reporting STA to set the field in the STA profile subelement corresponding to the reported STA to the first predefined value to indicate that the STA profile subelement corresponding to the reported STA is to be interpreted to provide all information that would be included in the frame if transmitted by the reported STA, except for one or more predefined elements.

* * * * *